June 30, 1970 — G. HÜTZ — 3,517,925

CONVEYOR SYSTEM FOR FIBER MATS

Filed Oct. 24, 1968

INVENTOR:
Gerhard Hütz

BY Karl J. Ross
Attorney 3,517,925
CONVEYOR SYSTEM FOR FIBER MATS
Gerhard Hütz, Suchteln, Germany, assignor to
G. Siempelkamp & Co., Krefeld, Germany, a
corporation of Germany
Continuation-in-part of application Ser. No. 712,687,
Mar. 13, 1968. This application Oct. 24, 1968, Ser.
No. 770,256
Claims priority, application Germany, Oct. 25, 1967,
1,653,308
Int. Cl. B65g 37/00; B65h 29/12
U.S. Cl. 271—76
5 Claims

ABSTRACT OF THE DISCLOSURE

A twin-conveyor system for fiber mats of the type in which a first conveyor belt passes a succession of fiber mats (e.g. to be made into pressed board) onto a second conveyor in order to space the fiber mats apart, to stack the mats preparatory to charging a multiplaten press, etc. To prevent deterioration at the leading edges of the mat, the stepless transition region of the conveyor system is provided at the junction of the conveyors, with a table of the take up conveyor above the deflecting roller or drum thereof which holds the upper stretch of the deflecting conveyor in contact with the downwardly deflected pass of the preceding conveyor at its discharge side.

---

This application is a continuation-in-part of my application Ser. No. 712,687, filed Mar. 13, 1968.

The present invention relates to a conveyor apparatus for the transport of loosely coherent mats and, in particularly, to a twin-conveyor system for the displacement of fiberboard mats adapted to be formed into pressed board.

It has already been proposed to make use of twin-conveyor system for the transportation of loosely coherent mats of wood or cellulosic fibers, for example, in order to deposit these mats upon respective platens of a platen press, the stages of a charging station in such presses, in one or more stages of a pre-pressing apparatus, or to separate the sheets in order to allow them to be displaced or stacked as indicated. In sheet-separating systems (see the commonly owned Pats. No. 3,224,758 and No. 3,332,819 issued Dec. 21, 1965 and July 25, 1967 to Eugen Siemplekamp and corresponding to German published application DAS 1,166,093), a first conveyor at which the mats may be formed or initially subdivided into rectangular masses, deposits the sheets or mats upon a second conveyor which is designed to be operated at a higher speed after full delivery of the mat or in conjunction with a mat-deposition arrangement which carries out the transfer with no relative movement between the mat and the second conveyor. By virtue of the difference in speeds, the space between any preceding mat increases and enables the mats to be transferred to a multilevel charging station or storage system as described in said patents. The problems involved in the transfer of loosely coherent mats from one conveyor to another derive in major part from the fact that the leading and trailing edges of the mat tend to crumble at any unsupported gap between conveyors and the use of intermediate tables between conveyors is ineffective to overcome this problem because sliding engagement of the mat with a stationary surface leads to elongation of the mat or other shape change and to deterioration. Furthermore substantially all previous systems for solving the problem have required prepressing of the fiber mats to increase the coherency thereof and thereby have nesessitated additional steps which might not otherwise have been necessary.

In my commonly assigned copending applications Ser. Nos. 672,639 and 712,687 filed Oct. 3, 1967 and Mar. 13, 1968, respectively, I have described twin-conveyor sheet-transfer systems in which attempts have been made to overcome these disadvantages.

It is, therefore, the principal object of the present invention to provide an improved twin-conveyor system for the transfer of loosely coherent fiber mats and extend the principles originally set forth in these copending applications.

In my application Ser. No. 672,639, now U.S. Pat. No. 3,450,030 of June 17, 1969, I have described and claimed a method of and an apparatus for the charging of platen presses with the relatively loosely coherent mat-like sheets of fiber which are adapted to be hot-pressed into rigid or semi-rigid bodies whose density depends upon the nature of the fiber, the presence or type of binder and the temperature and pressure conditions within the press (incidently the press may be of the type shown in commonly owned U.S. Pat. 3,050,200) and a corresponding charging system may be used.

Prior to the system described in application Ser. No. 672,639, various transport methods were commercially employed in the formation of so-called pressed board. In these systems the fibrous material is usually cellulosic in nature and may be sawdust, wood chips or wood dust, powdered wood, exploded wood fiber, waste comminuted cellulosic substances and the like. In some cases, the binder is the natural lignin and abietic resins within the wool while, in other instance, phenolformadehyde or phenol-urea or resorcinol synthetic resins may be used as binders. In this application, I have described an arrangement using a single-level or multilevel platen press having two vertically spaced horizontal platens shiftable between an open position providing a space between the platens, and a closed position in which a mat of loosely coherent fibers is compressed in this space. A charging conveyor pallet receives the fiber mat from a dispension station and deposits the mat within the space between the platens of the press. The conveyor pallet has an endless drivable conveyor band forming a mat-receiving surface and having a discharge side at which the mat-receiving surface turns downwardly into the return station of the conveyor. The mat is discharged upon movement of the upper stretch of the band toward the discharge side as the pallet as a whole is drawn in the opposite direction simultaneously, thereby preventing distortion of the mat. A key feature of the invention described in application Ser. No. 672,639 is that the mat disposed upon the upper stretch of the conveyor pallet has a leading edge which is set back from the discharge side of the conveyor band. The setback is so arranged that the mat passes over the discharge side of the conveyor only when the speed of the conveyor has reached its maximum or so-called "mat-deposition speed."

In U.S. Pat. 3,224,758, a similar system is described for the movement of fiber mats without distortion. In my copending applicaion Ser. No. 712,687, I have described an arrangement for limiting deterioration of the mats at the junction between a pair of conveyors but deflecting the upper stretch or reach of the lower or receiving conveyor upwardly ahead of the discharge tongue of the upper conveyor. Thus the discharge tongue of the upper conveyor and the lower conveyor form an inclined ramp and are substantially contiguous at the discharge side of the upper conveyor and the input side of the receiving conveyor.

Just ahead of the region at which the depositing conveyor turns under its discharge edge, a deflecting body is provided and is coupled with the tongue for movement relative to the lower conveyor synchronously with the band movement of the upper or a depositing conveyor to act as a deflecting means in the manner described. The deflecting means may be a wedge-shaped relatively thin body whose upper and lower surfaces converge in the direction of movement of the loosely coherent mats and may engage the receiving conveyor from below to deflect it upwardly around the discharge edge of the upper conveyor in substantially S-shaped or stepped configuration. While direct contact may be permitted between the deflected upper reach of the receiving conveyor in the underturned return reach of the depositing or upper conveyor, I have preferred to provide a separating member of sheet material or low-friction material (e.g. a polytetrafluoroethylene foil) along the underside of the transfer tongue of the upper conveyor as a partition between the underlying upper reach of the receiving conveyor and the return reach of the upper depositing conveyor.

It is another object of this invention to provide an improved twin-conveyor transfer arrangement for displacement of fiber mats without damage thereto.

I have now found that it is possible to transfer loosely coherent mats of the character described between a depositing conveyor and a receiving conveyor with a simpler arrangement than that set forth in the last-mentioned copending application and without the danger of deterioration of the fiber mats by forming the upper reaches or stretches of the conveyors as generally coplanar and providing above the deflecting roller or drum at the input side of the downstream or receiving conveyor, a platform at which the conveyor band of this downstream conveyor is deflected into its mat-displacing stretch and positioning the table or plate with respect to the discharge edge of the upstream conveyor such that the conveyor bands substantially contact one another at this edge and substantially no gap is provided between them.

According to the principles of the present invention, a mat can be transferred from the upstream conveyor to the downstream conveyor at a stepless junction between the conveyors formed by a forwardly converging discharge tongue at the discharge side of the upstream conveyor so that the band of the latter is deflected downwardly and rearwardly over a relatively narrow radius, the downstream conveyor band substantially contacts the upstream conveyor band in the region of this curve tongue. The downstream conveyor band, moreover, may be provided with a relatively large-radius drum above which the table is positioned and overhung by the tongue.

Advantageously, the deflecting edge of this table is provided with a radius or is rounded so that the rising portion of the conveyor band passes smoothly into its horizontal reach. Furthermore, the tongue of the upstream conveyor and the deflecting edge of the table are preferably disposed within the outline of the drum of the receiving conveyor.

It will be understood that the drum of the receiving conveyor, the table and the discharge tongue of the depositing conveyor may all be fixedly positioned when transfer of a mat from the upstream conveyor to the downstream conveyor is required, but that the table, the discharge tongue and the deflecting drum of the receiving conveyor can be shiftable in the direction of displacement of the mat to enable deposition of the mat without relative movement of the mats and a higher speed downstream conveyor as described in the U.S. Pats. No. 3,224,758 and No. 3,332,819 and my application Ser. No. 712,687.

It has also been found to be desirable to provide means for adjusting the discharge tongue of the upstream conveyor in the vertical direction.

The above and other objects, features and advantages of the present invention will become more readily apparent from the following description, reference being made to the accompanying drawing in which.

Figure 1:
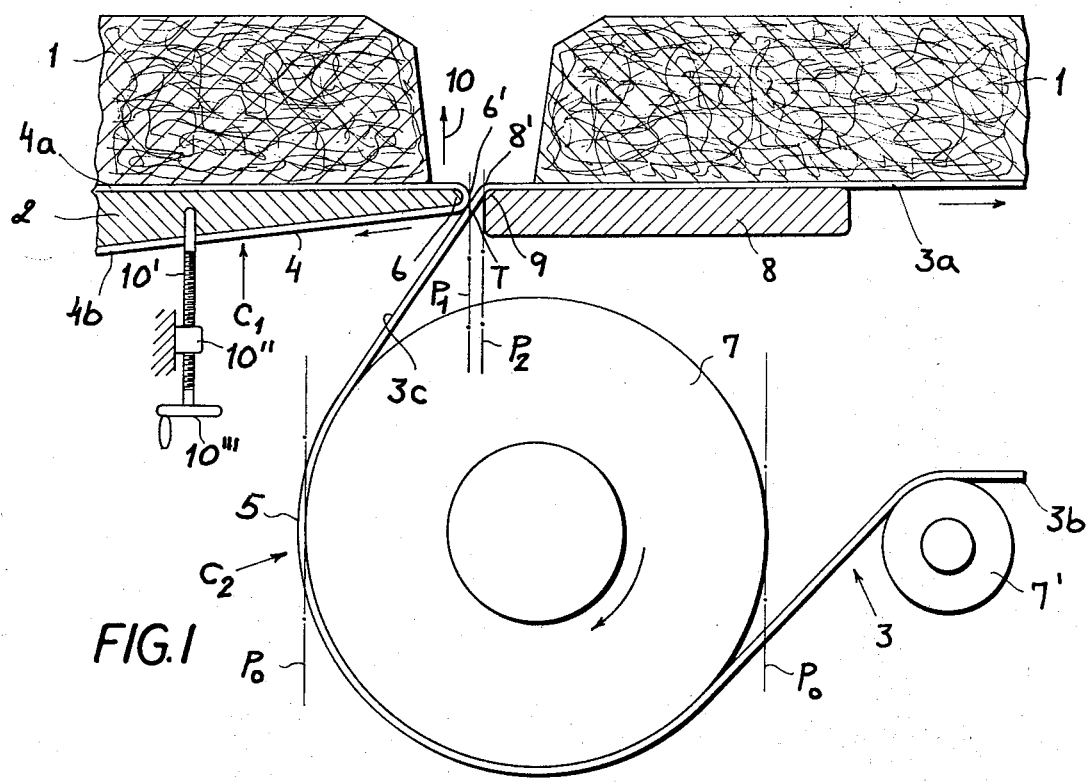
FIG. 1 is a vertical cross-sectional view through a conveyor arrangement embodying the present invention.
Figure 2:
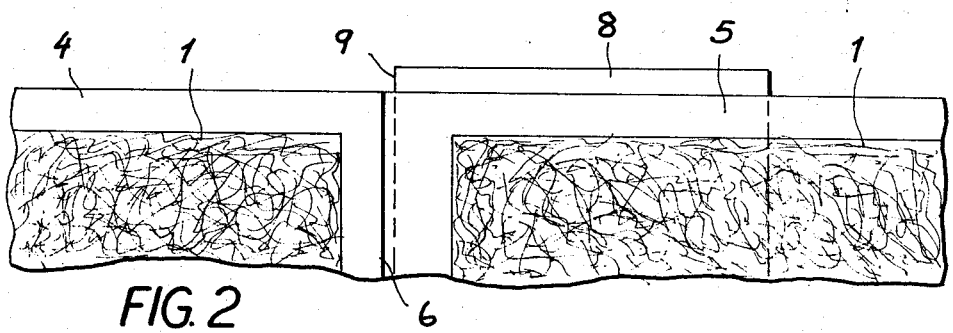
FIG. 2 is a plan view of a portion of this conveyor arrangement.

In the drawing, I have shown a dual or twin-conveyor system comprising a pair of conveyor belts $C_1$ and $C_2$ hereinafter referred to as the upstream or depositing conveyor and the downstream or receiving conveyor, respectively.

The conveyors $C_1$ and $C_2$ may be constituted as shown in my application Ser. No. 712,687 and the applications or patents therein mentioned. Consequently, only the discharge tongue 2 and the input side 3 of the conveyors have been shown.

Figure 3:
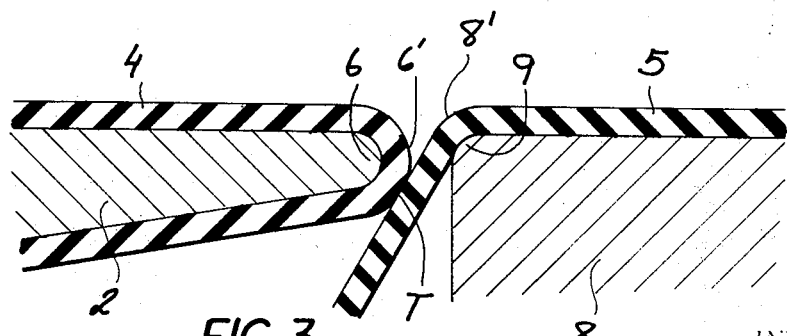
FIG. 3 is a detail view, drawn to an enlarged scale, of the junction of the conveyors.

As will be apparent from FIGS. 1 and 3, the discharge side of the upstream conveyor $C_1$ comprises a wedge-shaped tongue 2 having a rounded deflecting edge 6 of relative small radius about which the conveyor band 4 passes. The conveyor band 4 thus defines an upper reach 4a upon which a loose coherent mat 1 is carried, the upper reach bending downwardly into the return or lower reach 4b about the edge 6.

The downstream conveyor has an upper reach 3a which is coplanar with the upper reach 4 and carries the fiber mats away from the junction of the conveyor. From the lower reach 3b, the belt passes over an idler roller 7' about the deflecting drum 7 which is of relatively large diameter and thence upwardly at 3c into the upper reach 3a.

According to the principles of this invention, the discharge edge 6' of conveyor $C_1$ is located in the vertical plane $P_1$, i.e. within the outlines of the drum 7 defined between the planes $P_0$. Similarly, an input edge 8' of the upper reach 3a of conveyor band 5 is defined in the plane $P_2$ such that the distance between the planes $P_1$ and $P_2$ should be as close to zero as possible and preferably in substantially more than the sum of the thicknesses of the bands 4 and 5.

An important feature of this invention resides in the provision of a receiving table 8 above the drum 7 to establish the input edge 8', the edge 9 being rounded to allow a smooth transition of the band 5 from its lower stretch to its upper stretch. The radius of the rounded edge 9 is preferably equal to or less than the radius of the rounded portion 6 of the tongue 2. As a consequence of this construction there is substantially no gap between the band 4 and 5, which preferably contact one another at T so that no deterioration of the edges of the mats occurs.

I have found it to be advantageous to provide means, e.g. a screw 10', a fixed nut 10" and a handwheel 10''' to allow the edge 6 of the tongue 2 to be raised and lowered as represented by the arrow 10.

I claim:
1. In a plant for the production of fiber board wherein fiber mats are transported to a press, a twin-conveyor system for the transportation of said fiber mats comprising, in combination, an upstream conveyor receiving a succession of said mats for conveyance to a discharge edge of the upstream conveyor; beyond said upstream conveyor and receiving said mats therefrom, said upstream conveyor being formed with a discharge tongue converging in the direction of said downstream conveyor and defining a discharge edge at which a conveyor band of said upstream conveyor is deflected downwardly from an upper reach, said downstream conveyor being formed with a deflecting drum overhung by said tongue and having respective conveyor band passing upwardly about said drum to form an upper reach of said downstream conveyor; and a receiving table spaced above said drum and having a planar upper surface for deflecting the conveyor band of said downstream conveyor into its upper reach and along said surface proximal to said discharge edge, said surface having an upstream edge over which said conveyor band of said downstream conveyor is passed and defining an upwardly and forwardly inclined linear reach of said conveyor band of said downstream conveyor, said upstream edge lying within an upward projection of said drum in a horizontal plane corresponding substantially to said surface, said conveyor bands being substantially in contact with one another between said edges.

2. The combination defined in claim 1 wherein said edges are rounded and the upper reachs of said conveyor bands are substantially coplanar.

3. The combination defined in claim 2 wherein said drum has a radius in excess of the radii of curvature of said rounded edges.

4. The combination defined in claim 3, further comprising means for vertically shifting said rounded edge of said tongue.

5. The combination defined in claim 3 wherein both said rounded edges lie within the outlines of said drum.

References Cited

UNITED STATES PATENTS

| | | | |
|---|---|---|---|
| 1,160,792 | 11/1915 | Van Houten | 198—76 |
| 1,494,655 | 5/1924 | Westerman | 198—184 |
| 2,442,250 | 5/1948 | Spain | 198—35 |
| 3,224,758 | 12/1965 | Siempelkamp | 271—69 |
| 3,291,282 | 12/1966 | Pedagno | 198—102 |

RICHARD E. AEGERTER, Primary Examiner

U.S. Cl. X.R.

198—102